(12) United States Patent
Berfanger et al.

(10) Patent No.: US 10,194,035 B2
(45) Date of Patent: Jan. 29, 2019

(54) IMAGER CALIBRATION VIA MODELED RESPONSES TO IMPORTANCE-WEIGHTED COLOR SAMPLE DATA

(71) Applicant: Hewlett-Packard Development Company, L.P., Houston, TX (US)

(72) Inventors: David Berfanger, Vancouver, WA (US); Tabor N Kelly, Vancouver, WA (US); Dean H Ouchida, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 15/307,157

(22) PCT Filed: Apr. 29, 2014

(86) PCT No.: PCT/US2014/035875
§ 371 (c)(1),
(2) Date: Oct. 27, 2016

(87) PCT Pub. No.: WO2015/167460
PCT Pub. Date: Nov. 5, 2015

(65) Prior Publication Data
US 2017/0048400 A1 Feb. 16, 2017

(51) Int. Cl.
*H04N 1/46* (2006.01)
*H04N 1/00* (2006.01)
*H04N 1/60* (2006.01)

(52) U.S. Cl.
CPC ..... *H04N 1/00087* (2013.01); *H04N 1/00005* (2013.01); *H04N 1/00018* (2013.01); *H04N 1/00023* (2013.01); *H04N 1/6052* (2013.01)

(58) Field of Classification Search
CPC ........... H04N 1/00087; H04N 1/00005; H04N 1/00018; H04N 1/00023; H04N 1/6052
USPC .................. 358/1.1, 504, 1.9, 518, 521, 512
See application file for complete search history.

(56) References Cited

U.S. PATENT DOCUMENTS

| 5,625,378 | A  | 4/1997  | Wan et al.     |
|-----------|----|---------|----------------|
| 8,325,394 | B2 | 12/2012 | Klassen et al. |
| 8,467,095 | B2 | 6/2013  | Hindi et al.   |
| 8,638,340 | B2 | 1/2014  | Holub          |
| 2009/0052776 | A1 | 2/2009 | Tehrani et al. |
| 2009/0257652 | A1 | 10/2009 | Liu et al.    |

(Continued)

FOREIGN PATENT DOCUMENTS

| JP | 2011113083 | 6/2011 |
| JP | 2012165232 | 8/2012 |

OTHER PUBLICATIONS

Finlayson, G. et a., Constrained Least-squares Regression in Color Spaces, (Research Paper), Univeristy of Derby, Oct. 1997, On pp. 484-493, vol. 6.

(Continued)

*Primary Examiner* — Douglas Q Tran
(74) *Attorney, Agent, or Firm* — Robert C. Sismilich

(57) ABSTRACT

Calibration of a target imager. Responses of the target imager and a reference imager to predetermined importance-weighted color sample data are modeled using a predetermined target and reference imaging attributes. A calibration for the target imager is determined using the modeled responses and a predetermined calibration for the reference imager.

16 Claims, 6 Drawing Sheets

(56) References Cited

U.S. PATENT DOCUMENTS

2012/0133962 A1* 5/2012 Kondo ................ H04N 1/6033
  358/1.9
2013/0021631 A1   1/2013 Nachlieli et al.
2013/0077859 A1   3/2013 Stauder et al.
2015/0350460 A1* 12/2015 Hirata ................ H04N 1/0057
  358/498

OTHER PUBLICATIONS

Shi, M. et al., Using Reflectance Models for Color Scanner Calibration, (Research Paper), UC Irvine, Apr. 1, 2002, pp. 645-656, vol. 19, Issue: 4.

Vrhel, M.J. et al., (Research Paper), Color Scanner Calibration via a Neural Network, Color Savvy Syst. Ltd., Mar. 1999, vol. 6, On pp. 1520-6149.

* cited by examiner

FIG. 5

COMPUTE A CALIBRATION FOR THE TARGET IMAGER 430

CONSTRAIN THE TARGET CALIB'N TO MAP THE TARGET RESPONSE FOR WHITE TO THE SAME COLOR SPACE COORD'S AS THE REFERENCE CALIB'N, AND REDUCE THE CONSTRAINED CALIB'N TO AN UNCONSTRAINED ONE WITHOUT LAGRANGE MULTIPLIERS 505

ASSIGN A HIGHER WEIGHT TO SELECTED COLORS SO OUTPUT OF THE TARGET IMAGER FOR THE SELECTED COLORS MATCHES OUTPUT OF THE REFERENCE IMAGER FOR THE SELECTED COLOR SAMPLES RELATIVELY MORE CLOSELY 510

CALCULATE AN ERROR FOR COLORIMETRIC DIFFERENCE BETWEEN TARGET IMAGER OUTPUT AND REFERENCE IMAGER OUTPUT FOR THE SAMPLE DATA 525

ITERATIVELY SOLVE A NON-LINEAR EQUATION UNTIL THE TARGET CALIBRATION YIELDS AN OPTIMUM ERROR VALUE 530

CONVERT THE MODELED RESPONSES INTO COLORIMETRIC TARGET COORDINATES BEFORE CALCULATING ERROR 535

APPROXIMATE THE ERROR AS A 2ND DEGREE MULTILINEAR TAYLOR SERIES EXPANSION WITH RESPECT TO A MULTIVECTOR OF THE SET OF COLORIMETRIC TARGET COORDINATES ABOUT A MULTIVECTOR OF THE SET OF COLORIMETRIC REFERENCE COORDINATES 540

APPROXIMATE THE ERROR AS A 2ND DEGREE MULTILINEAR TAYLOR SERIES EXPANSION WITH RESPECT TO A MULTIVECTOR OF THE CURRENT TARGET IMAGER CALIB'N ESTIMATE ABOUT A MULTIVECTOR OF A PRIOR ESTIMATE 545

IMAGER CALIBRATION VIA MODELED RESPONSES TO IMPORTANCE-WEIGHTED COLOR SAMPLE DATA

BACKGROUND

Digital imaging systems use imagers that generate and output digital color signals of an imaged subject. A digital scanner, for example, may image a document placed adjacent a scanbar. A digital camera may image a scene which its lenses focus onto a CCD. Other types of digital imaging systems may have other types of imagers which operate analogously.

BRIEF DESCRIPTION OF THE DRAWINGS

FIG. 5 is a lower-level flowchart of an operation according to an example of the present disclosure for computing a calibration of a target imager usable with the method of FIG. 3.

DETAILED DESCRIPTION

Figure 1:
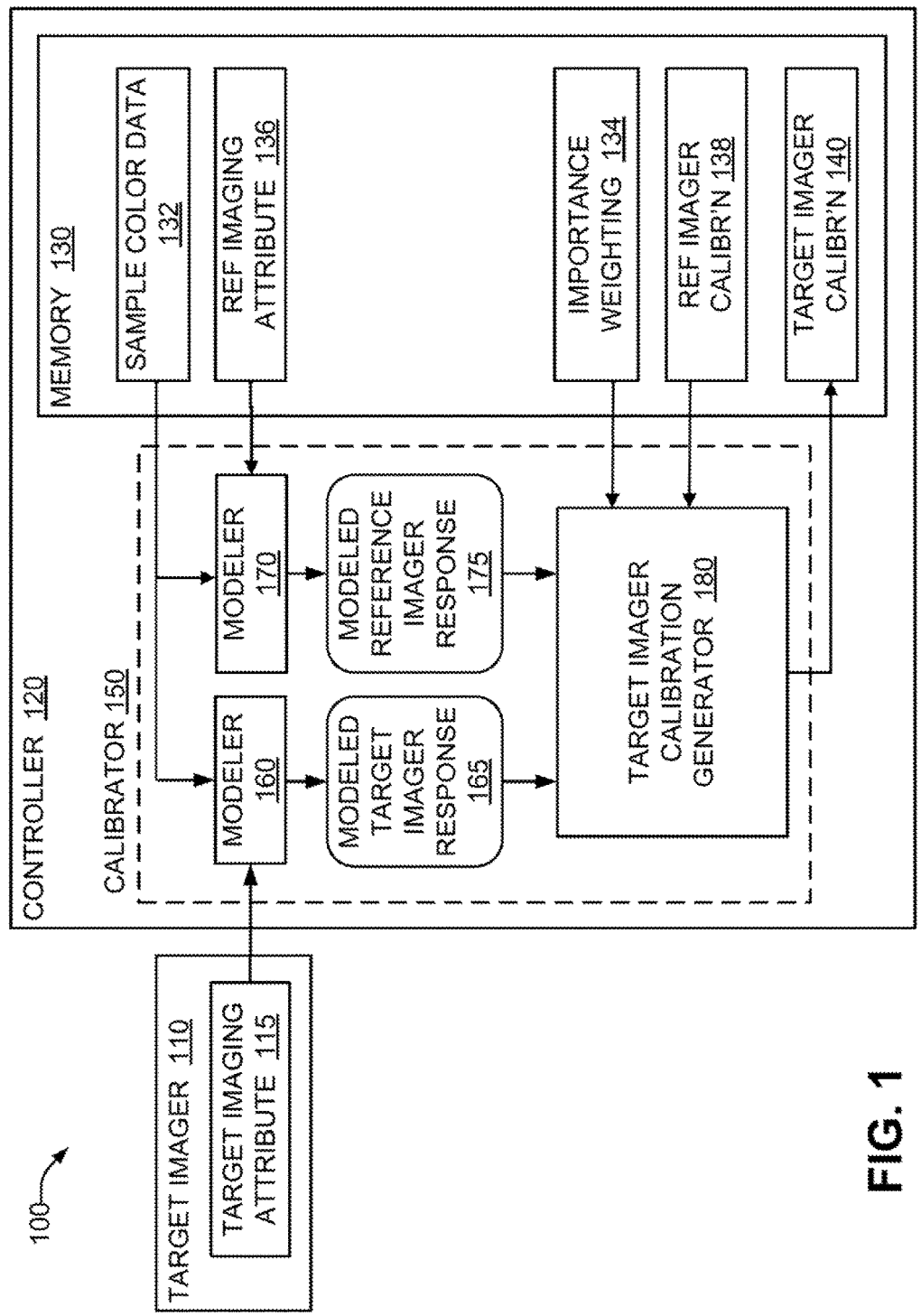
FIG. 1 is a schematic block diagram representation of an imaging device including a target imager in accordance with an example of the present disclosure.

A measure of the image quality of a digital imaging device is the faithfulness with which it captures the colors of the imaged subject. Due to manufacturing and other differences among a population of imagers used in the devices, different imaging devices—even of the same model—may disadvantageously generate different digital color output signals for the same imaged subject. In addition, typically the digital color output signals also disadvantageously differ from the actual colors of the imaged subject as perceived by human vision, even for colors of the imaged subject which fall within the color gamut that can be reproduced by the imaging device. To alleviate this, the imaging device may be color-calibrated, and the calibration applied to the color output signals generated by the imager in order to more accurately record the colors imaged by the sensor. In addition, since the imager typically generates signals which are device-dependent, the imaging device often transforms the device-dependent signals into a common color representation, herein called a color connection space. Such color connection spaces may include device-referred color encodings like sRGB defined by the International Electrotechnical Commission (IEC), and device-independent color spaces like CIEXYZ and CIELAB defined by the International Commission on Illumination (CIE—Commission Internationale de l'Eclairage in French). The color connection space is typically a color encoding that specifies color in terms of selected primary colors that substantially agree with human visual perception. In cases where the color measurements are made relative to the CIE standard observer, the color connection space may be said to be "colorimetric".

A digital scanner is one type of digital imaging device that scans printed samples and provided digital color image representations. A typical scanner scans an original subject such as, for example, a sheet of media, and produces a device-dependent set of device response signals. In order to map this set of device response signals into a closely approximate representation in a selected color connection space, the scanner is calibrated. Subsequently, such representations can be shared with another component (e.g., a monitor or printer), enabling it to generate a reproduction of the original sample that closely approximates the correct color appearance. In some cases, such as a digital copier, a multifunction peripheral device (MFP), an All-in-One device (AiO), both the scanner and the printer may be included within the same device.

One approach to calibrating a scanner involves selecting a number of physical color samples, each of which is both scanned by the device, and measured by a spectrophotometer. Scanning the color samples with the device produces a data set of device response signals (e.g., device RGB). Measuring the color samples with a spectrophotometer permits the production of a corresponding data set of color connection space coordinates (e.g., CIEXYZ). Subsequently, these two data sets are provided to calibration software, which produces a mapping between them. The calibration software, however, is computationally intensive. This calibrating technique disadvantageously requires the use of one or both of a specially prepared calibration target and an additional instrument (the spectrophotometer), and thus can be prohibitively expensive, labor intensive, and time consuming to be performed even on the assembly line, much less during typical use and servicing of the scanner. It also is generally not automatable as the procedure often includes manual adjustments made by expert practitioners.

Another approach to calibrating a scanner does not use physical color samples, but rather virtual color samples (i.e. color sample data) defined in the context of comprehensive mathematical models based on particular characteristics of a scanner and the media to be scanned. These models are used to produce both a data set of modeled device response signals for the scanner and a corresponding data set of modeled color connection space coordinates for the scanner. Subsequently, these two data sets are provided to calibration software, which produces a mapping between them. While this method of scanner calibration can reduce the labor and time to perform the calibration, the calibration software disadvantageously is too computationally intensive to execute in the limited resource environment of typical scanner hardware, and is generally not automatable as it, too, often includes manual adjustments made by expert practitioners.

In the above calibration techniques, the device calibration may be defined as a simple linear mapping between the device response signals and corresponding coordinates in the color connection space. For example, considering a set of N color samples, one may obtain the CIEXYZ values for the n th color sample, denoted $[X_n \ Y_n \ Z_n]$, from corresponding device RGB response signals, denoted $[R_n \ G_n \ B_n]$, by applying a 3×3 transformation matrix M, as follows:

$$[X_n \ Y_n \ Z_n] = [R_n \ G_n \ B_n] M$$

For this purpose, the matrix M is often found automatically using a least-squares optimization over the N color samples. However, since the relation between the two sets of values is not, in general, linear over the color gamut of the scanner, such efforts do not often lead to acceptable results. To improve the results obtained from a simple linear calibration model, univariate nonlinear functions are often applied to device response signals prior to the linear mapping. Common approaches to defining the univariate transformation functions include selecting them to linearize the neutral axis response of the device or to further minimize calibration errors over the color gamut of the device. While the use of such nonlinear transformations typically improves calibration results, the obtained results are often still not acceptable. To further improve calibration results, multivariate techniques may also be used. While this approach can produce acceptable results, it is significantly more expensive computationally than a simple linear model. Furthermore, producing acceptable mappings is not trivial and often disadvantageously requires manual adjustments by expert practitioners.

Referring now to the drawings, the present disclosure provides a digital imaging device and method of color calibration that can be efficiently and cost-effectively implemented in the imaging device, as it does not use either a specially-prepared calibration target or a spectrophotometer or similar instrument, and can be implemented (in firmware in one example) within the limited resource environment of typical imaging device hardware, and can be performed automatically. The imaging device and method use information about a preidentified reference imager. The reference imager may be a "golden" imager that has been preselected for the proximity of its color output signal to the nominal output signal of a plurality of imagers. The reference imager is precharacterized in terms of both at least one imaging attribute of the imager, and a calibration of its color output signals to coordinate values in a color connection space. Both the reference imaging attribute(s) and the reference calibration are prestored in the imaging device. The corresponding imaging attribute(s) of the imager (referred to as the target imager) which is installed in or coupled to the imaging device are prestored in the target imager.

During calibration, the response of both the target imager and the reference imager to a set of predefined and prestored color sample data are modeled using, in each case, an imaging attribute of the corresponding imager. Each of the set of sample data is assigned an importance weighting for use in calibration. A calibration of the target imager is then computed using the modeled responses of the reference and target imagers, the prestored importance weightings, and the prestored calibration of the reference imager. The computation of the target imager calibration includes calculation of a colorimetric error, or difference in calibrated color output data, between the target imager and the reference imager. This calculation is advantageously implemented in a simpler and less computationally intensive manner by approximating the colorimetric error with a multilinear Taylor series expansion with respect to the target calibration about a multivector defined by the reference calibration, leading to a solution which can be implemented efficiently in device firmware. In one example, a closed-form multilinear equation is solved. In another example, a simpler iterative non-linear equation is solved. Modeling the responses of the target and reference imagers advantageously limits the impact of measurement noise and out-of-gamut colors on the calibration. In addition, since the technique leverages the reference image calibration and works to correct relative differences in modeled device-dependent color output between the target imager and the reference imager and then to use these differences to modify the reference imager calibration to produce the target imager calibration, the models used are inherently simpler and more tractable than models of comparable accuracy which map the device-dependent color output of the target imager directly to the color connection space.

As defined herein and in the appended claims, an "imager" may be broadly understood to mean a component usable in, or capable of being communicatively coupled to, an imaging device for generating color output signals indicative of a subject imaged by the imager.

As defined herein and in the appended claims, an "imaging attribute" may be broadly understood to mean a characteristic of an imager that describes an aspect of its imaging performance.

As defined herein and in the appended claims, a "calibration" may be broadly understood to mean a set of calibration parameters usable to transform uncalibrated color response data produced by an imager for an imaged subject into calibrated image data that closely approximates the true colors of the subject and which is usable by subsequent processing stages of an imaging device.

Considering now one example imaging device, and with reference to FIG. 1, an imaging device 100 includes a target imager 110 and a controller 120. The target imager 110 has a target imaging attribute 115 that is accessible to the controller 120. The controller 120 includes a memory 130 and a calibrator 150 and is communicatively coupled to the target imager 110. The memory 130 stores prestored data including color data 132 for a set of samples, a set of importance weightings 134 that includes a weighting for each corresponding one of the set of color sample data 132, at least one imaging attribute 136 of a reference imager, and a calibration 138 for the reference imager. The calibrator 150 includes a target modeler 160 that models a response of the target imager 110 to the color sample data 132 using the target imaging attribute 115 to generate a modeled target imager response 165. The calibrator 150 also includes a reference modeler 170 that models a response of the reference imager to the color sample data 132 using the reference imaging attribute 136 to generate a modeled reference imager response 175. The calibrator 150 further includes a target imager calibration generator 180 that computes a calibration 140 for the target imager 110 from the modeled target imager response 165, the modeled reference imager response 175, the importance weighting set 134, and the reference imager calibration 138. The calibration 140 may be stored in the memory 130.

In some examples, the modelers 160, 170 may perform the same function in the same manner and, where implemented in firmware, may be the same code.

Figure 2:
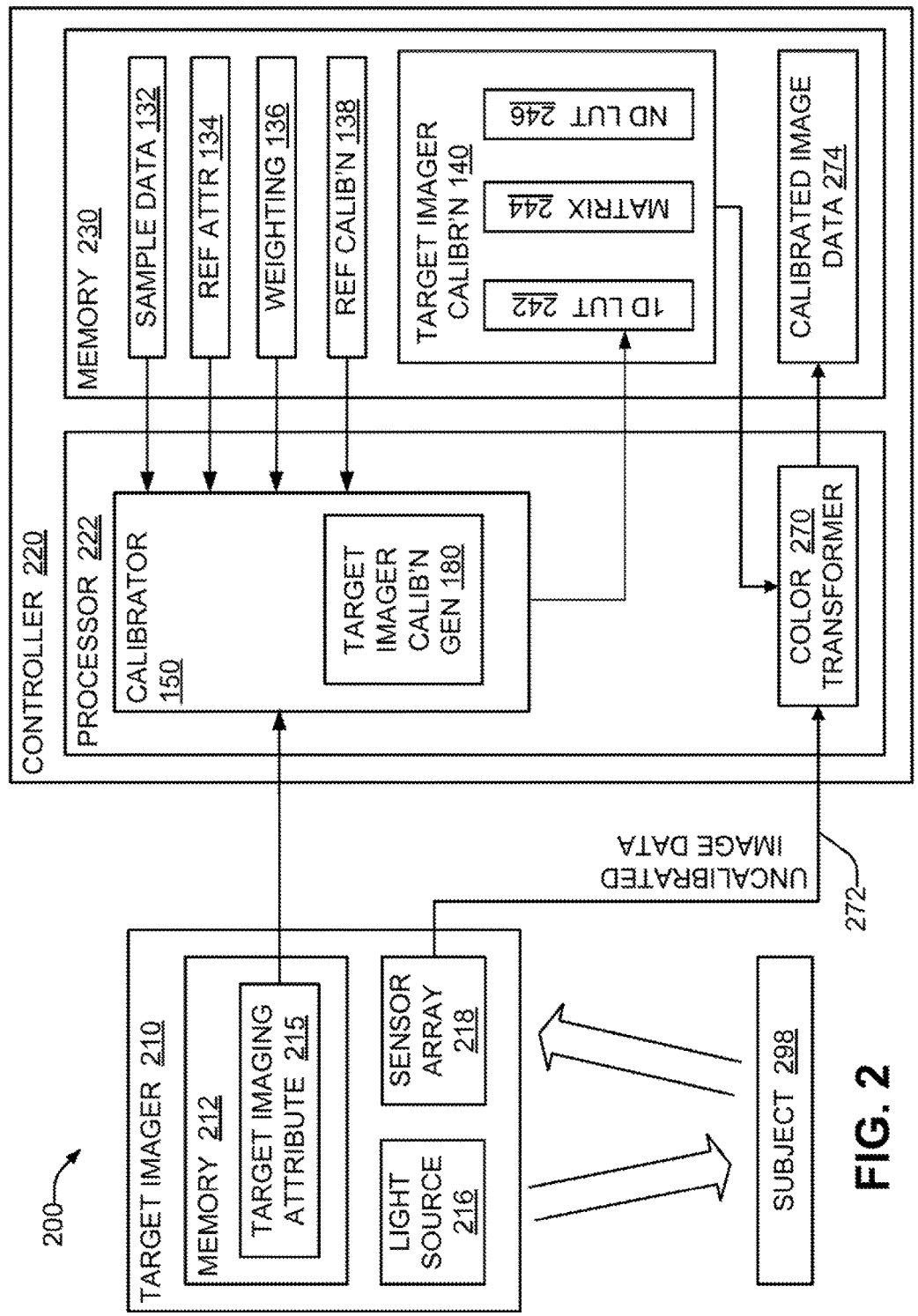
FIG. 2 is a schematic block diagram representation of an optical scanner imaging device in accordance with an example of the present disclosure.

Considering now, with reference to FIG. 2, another example imaging device 200 having a target imager 210 which is an optical scanner. The target imager 210 may include a memory 212 that stores a target imager attribute 215, a multicolor illumination source 216 that illuminates a subject 298 (which is not part of the imaging device 200) during a scan operation, and a photosensor array 218 that detects the light radiation that is reflected from the subject 298 during the scan operation. The imaging device 200 may include a processor 222 that executes instructions for the calibrator 150, including the target imager calibration generator 180, where they are implemented in firmware or software. The imaging device 200 also includes a memory 230. The memory 230 stores the color sample data 132, the reference imager attribute 136, the importance weighting set 134, the reference imager calibration 138, and the target calibration 140.

During the manufacture of the target imager 210, the emission spectrum of each color of the illumination source 216 is measured using an external spectrometer. The resulting emission spectra are encoded to form the target imaging attribute 215, which is then stored in the memory of the target imager 210. As defined herein and in the appended claims, the term "spectrum" may be broadly understood to mean a relative distribution of radiant power emitted or reflected from a surface across a range of wavelengths. The spectrum may be expressed as a function of wavelength $\lambda$. For example, the illumination source of the target imager 110 may comprise three colors RGB (red, green, blue), where the emission spectra of the three colors are expressed respectively as the three functions $\bar{r}(\lambda)$, $\bar{g}(\lambda)$ and $\bar{b}(\lambda)$. When measuring the emission spectra of the illumination source 216, measurements are taken at discrete wavelengths sampled regularly over the visible wavelengths. For example, emission spectra may be measured over a wavelength range of 380 nm to 730 nm at 10 nm increments. The measurement at each of these wavelengths may be normalized to a value between 0 (no emission) and 1 (full emission). The three emission spectra of the target imager 110 may each be represented by 36 components measurements, $$r_\lambda = [\bar{r}(380)\ \bar{r}(390) \ldots \bar{r}(730)]^T,$$

$$g_\lambda = [\bar{g}(380)\ \bar{g}(390) \ldots \bar{g}(730)]^T,$$

$$b_\lambda = [\bar{b}(380)\ \bar{b}(390) \ldots \bar{b}(730)]^T,$$

which are then combined into a single 36×3 matrix $\varphi = [r_\lambda\ g_\lambda\ b_\lambda]$. The matrix $\varphi$ is then encoded to form the target imaging attribute 115. The encoding may involve either or both of lossless and lossy encoding methods, including the use of parametric models. The superscripted T represents the matrix transpose operation.

In other examples, the target imaging attribute 215 may be determined in a different manner, particularly where the target imager is a different type of imager than an optical scanner, and/or has a different type of illumination source 216 or no illumination source at all. The reference imaging attribute 136 for the reference (golden) imager may be determined in the same manner as the target imaging attribute 215 for a given type of target imager 110, 210.

The sample color data 132 comprises reflectance spectra of each of a set of selected color samples. In one example, an external spectrophotometer is previously used to measure the reflectance spectra of physical color samples. These color samples may be arranged on a single test target, such as for example the target defined by the "IT8.7/2-1993 (R2003) Graphic technology-Color reflection target for input scanner calibration" standard. Like the emission spectra, the reflectance spectra represent measurements taken by the spectrophotometer at discrete wavelengths sampled regularly over the visible wavelengths. For example, the reflectance spectra for each of the color samples may be measured over a wavelength range of 380 nm to 730 nm at 10 nm increments. In this example, each color sample has 36 data points, and each data point may be normalized to a value between 0 (no reflection) and 1 (complete reflection). Such a reflectance spectrum for the n th sample of a set of N color samples may be expressed as $$p_n = [p_n(380)\ p_n(390) \ldots p_n(730)]$$

and the complete set of reflectance spectra may be arranged in an N×36 matrix P.

The modeled target imager response 165 may be calculated according to a response model by the target modeler 160, at least in part from the target imaging attribute 115 and the sample color data 132. For each of the set of selected color samples, and an example target imager 110, 210 having red, green, and blue illumination sources, the modeled target imager response 165 may comprise red, green, and blue modeled response signals for that color sample. The red, green, and blue response signals collectively comprise a device-dependent color value for the sample. The color value is typically a fixed-bit value interpreted relative to the bit depth of the encoding used. For example, for an 8-bit encoding, color values range from 0 to 255, where 255 represents full signal strength. Such values may be normalized according to bit depth such that color values are represented on a proportional scale of 0 to 1, where 1 represents full signal strength. In this way, for an RGB (red, green, blue) image, black is represented by normalized RGB (0, 0, 0), white is represented by normalized RGB (1, 1, 1), red is represented by normalized RGB (1, 0, 0), green is represented by normalized RGB (0, 1, 0), blue is represented by normalized RGB (0, 0, 1), cyan is represented by normalized RGB (0, 1, 1), magenta is represented by normalized RGB (1, 0, 1), yellow is represented by normalized RGB (1, 1, 0), and other colors are represented by various other combinations of the normalized RGB component values. For a set of N color samples, the response 165 for the n th sample may be expressed as $$s_n = [R_n\ G_n\ B_n].$$

The complete data set of the modeled target imager response 165 may be arranged in an N×3 matrix S which may be calculated using a linear spectral detection model as $$S = P\varphi.$$

It should be noted that no measurement of the physical test target is made using the target imager 110, 210 in order to produce the modeled target imager response 165. Rather, the response 165 that would result if the physical test target were to be measured by the target imager 110, 210 is modeled (i.e. projected) by the target modeler 160.

The modeled reference imager response 175 may be calculated according to a response model by the reference modeler 170, at least in part from the reference imaging attribute 134 and the sample color data 132. This is done in an analogous manner to the modeled target imager response 165. The complete data set of the modeled reference imager response 175 may be arranged in an N×3 matrix $\tilde{S}$ which may be calculated using a linear spectral detection model as $$\tilde{S} = P\tilde{\varphi}$$

where $\tilde{\varphi}$ is the emission spectra of the illumination source of the reference imager, which is encoded to form the reference imaging attribute 136.

The reference imager calibration 138 $\tilde{\theta}$ is predetermined for the reference imager. In one example, two different measurements of a physical test target having the set of color samples are made. First, the physical test target is imaged with the reference imager to obtain measured reference imager response signals $\tilde{S}_{MEAS}$ for use in calculating the reference imager calibration 138 $\tilde{\theta}$. In the case of an example reference imager having red, green, and blue illumination sources, the measured reference imager response signals $\tilde{S}_{MEAS}$ may comprise red, green, and blue measured response signals for each color sample of the test target. Second, the physical test target is also measured by a spectrophotometer in order to obtain corresponding measured reference color connection space coordinates. In some examples, the reflectance spectrum of each of the color samples may be measured over a wavelength range of 380 nm to 730 nm at 10 nm increments in the manner described previously for the color sample data 132. The color connection space coordinates are then derived from the measured reflectance spectra using standardized calculations. For example, given an illuminant, observer, measurement interval, and measurement bandpass, the CIEXYZ values for a color sample can be calculated from the reflectance spectra by performing well-known calculations specified by the CIE. For a set of N color samples, the CIEXYZ coordinates for the n th sample may be expressed as $$c_n = [X_n\ Y_n\ Z_n],$$

and the complete data set may be arranged in an N×3 matrix $\tilde{C}_{MEAS}$. The reference imager calibration 138 $\tilde{\theta}$ is then calculated by calibration software—external to the imaging device 100, 200—that implements a color transformation which transforms the reference device response signals $\tilde{S}_{MEAS}$ into corresponding color connection space coordinates $\tilde{C}_{MEAS}$, according to the formula $$\tilde{C}_{MEAS} = f(\tilde{S}_{MEAS}, \tilde{\theta}).$$

The color transformation performed by the external calibration software, however, is highly complex, computationally intensive, and typically implemented using commercial math libraries. In addition, producing an acceptable reference calibration 138 $\tilde{\theta}$ often requires interactive guidance by an expert operator during execution and thus cannot be performed automatically. For these and other reasons, it is not feasible to determine the reference imager calibration 138 $\tilde{\theta}$ in the imaging device 100, 200. Instead, the reference imager calibration 138 $\tilde{\theta}$ is calculated externally, and provided to and prestored in the memory 130, 230.

The calibration generator 180 of the imaging device 100, 200 then computes a target imager calibration θ 140 from the modeled target imager response 165, the modeled reference imager response 175, the reference calibration 138 $\tilde{\theta}$, and the set of importance weightings 134. After the target imager calibration θ 140 has been computed, a color transformer 270 of the imaging device 100, 200 uses the target imager calibration θ 140 to transform uncalibrated image data 272 corresponding to the subject 298, generated by the target imager 210, into calibrated image data 274 that well approximates image data that would be generated if the reference imager were used to image the subject 298 and generate the image data.

Figure 3:
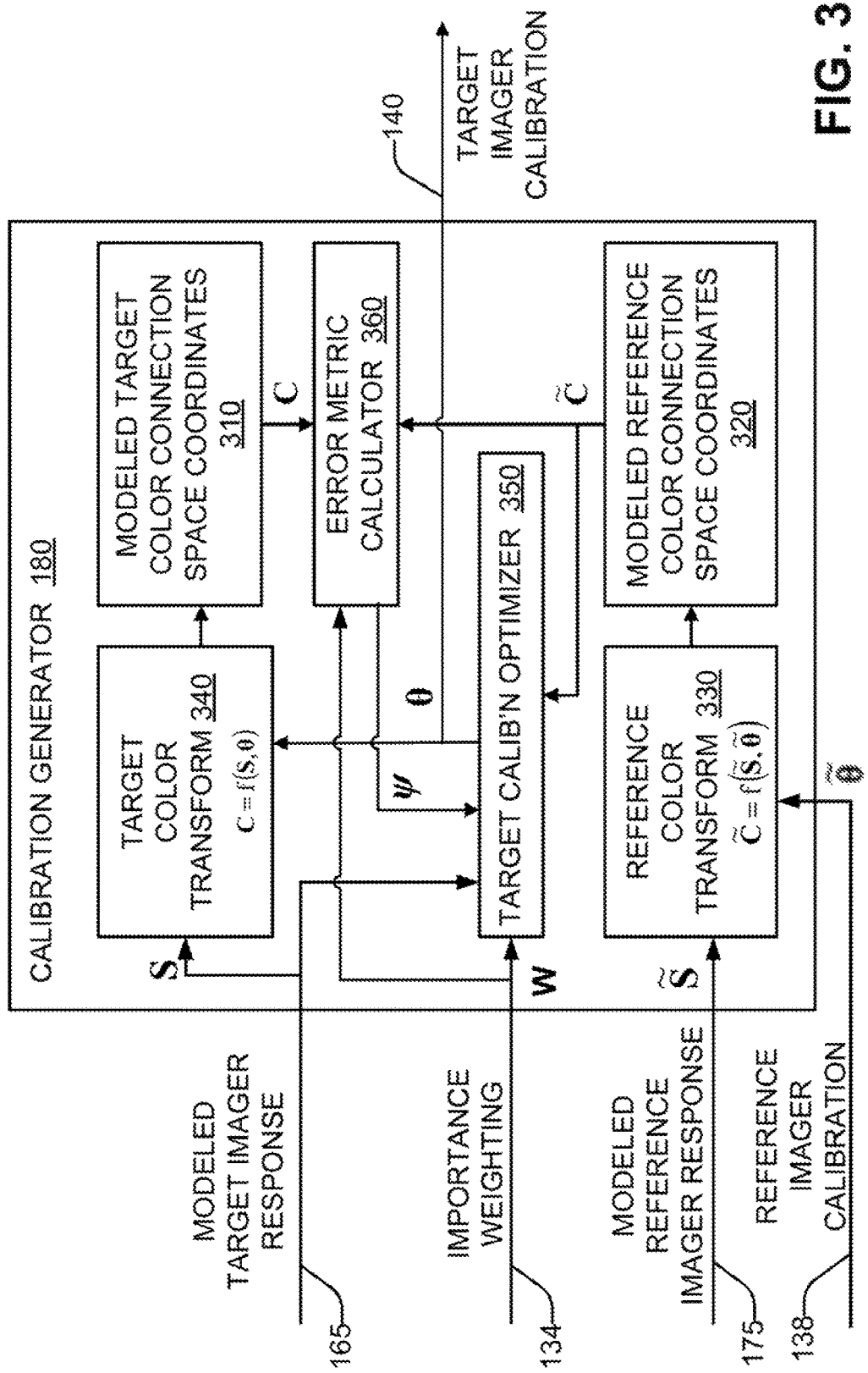
FIG. 3 is a schematic block diagram representation of a target imager calibration generator of the imaging device of FIG. 1 in accordance with an example of the present disclosure.

Considering now in greater detail one example of a target imager calibration generator 180, and with reference to FIG. 3, the calibration generator 180 generates a target imager calibration θ 140 of the target imager 110, 210 of the imaging device 100, 200. In some examples, a target imager calibration θ 140 may comprise parameters for one or more of a univariate transformation function 242, a linear transformation 244, and a nonlinear vector transformation 246. The univarate transformation function parameter 242 may comprise a one-dimensional lookup table ("1D LUT"); for an RGB target imager 110, 210, there may be three nonlinear univariate functions 242: $f_R$, $f_G$, and $f_B$. The linear transformation parameter 244 may comprise a matrix; for an RGB target imager 110, 210, the matrix may be the 3×3 transformation matrix M. The nonlinear vector transformation parameter 246 may comprise an N-dimensional lookup table ("ND LUT"); for an RGB target imager 110, 210, the nonlinear vector transformation may be the function $f_{XYZ}$.

The reference imager calibration $\tilde{\theta}$ 138 may be structured in the same or similar manner as the target imager calibration θ 140.

While the reference imager calibration 138 $\tilde{\theta}$ is precalculated externally, the target imager calibration generator 180 determines at least one of the parameters 242, 244, 246 of the target imager calibration θ 140 from the modeled target imager response 165, the modeled reference imager response $\tilde{S}$ 175, the reference calibration 138 $\tilde{\theta}$, and the set of importance weightings W 134. Each of the set of importance weightings W 134 comprises a weighting value for a corresponding one of the color samples in the sample color data 132. The weight indicates an importance assigned to that color sample for use in generating the target imager calibration θ 140. For example, for the optical scanner target imager 210, the relative weight of the sample data for a neutral color (i.e. a shade of gray) in the set of selected color samples may be 20 times greater than for a non-neutral color. Doing so allows the color output of the target imager 110, 210 for neutral color samples to match the color output of the reference imager for the neutral color samples more closely than for at least some non-neutral color samples.

In the calibration generator 280, a reference color transformer 330 uses the modeled reference imager response 175 and the reference imager calibration 138 to generate modeled reference color connection space coordinates 320. It is noted that the modeled reference color connection space coordinates 320 are different from the measured color connection space coordinates discussed previously in that the measured color connection space coordinates are measured using a spectrophotometer, while the modeled reference color connection space coordinates 320 are instead calculated by the calibration generator 280. In addition, the color samples that were measured to generate the reference calibration 138 may or may not correspond to the color sample data 132 used by the reference modeler 170 to generate the modeled reference imager response $\tilde{S}$ 175. The reference color transformer 330 transforms the modeled reference imager response signals $\tilde{S}$ 175 into corresponding modeled reference color connection space coordinates $\tilde{C}$ 320 according to the parameters of the reference imager calibration $\tilde{\theta}$ 138. It is convenient to summarize these operations by the single composite operation $\tilde{C} = f(\tilde{S}, \tilde{\theta})$.

A target calibration optimizer 350 then computes a target imager calibration θ 140 at least partially according to the modeled target imager response 165, the set of importance weightings W 134, and the modeled reference color connection space coordinates $\tilde{C}$ 320. In some examples, the target imager calibration θ 140 may initially be set equal to the reference imager calibration $\tilde{\theta}$ 138. The target calibration optimizer 350 is configured to adjust at least one of the parameters of the target imager calibration θ 140 so as to minimize a selected error metric ψ, as will be discussed.

A target color transformer 340 uses the modeled target imager response 165 and the target imager calibration θ 140 to generate modeled target color connection space coordinates 310. This may be done in the same or similar manner as the reference color transformer 340, where the target color transformer 340 transforms the modeled target imager response signals S 165 into corresponding modeled target color connection space coordinates C 310 according to the parameters of a target imager calibration θ 140. It is convenient to summarize these operations by the single composite operation C = f(S, θ).

An error metric calculator 360 calculates the value of an error metric ψ at least partially according to the modeled target color connection space coordinates C 310 and the modeled reference color connection space coordinates $\tilde{C}$ 320. The error metric ψ represents a colorimetric difference between (a) the modeled reference color connection space coordinates $\tilde{C}$ 320 derived from the modeled reference imager response $\tilde{S}$ 175 and the reference calibration $\hat{\theta}$ 138, and (b) the modeled target color connection space coordinates C 310 derived from the modeled target imager response S 165 and the target calibration θ 140. The objective of the target imager calibration θ 140 is to make C for the target imager closely approximate $\tilde{C}$ for the reference imager, such that the output for subjects imaged with the target imager 110 will closely approximate the output of the same subjects imaged by the reference imager. If the error metric ψ is not acceptably small, then adjustments can be made to the error metric calculator 360 and an updated target imager calibration θ 140 can be generated. Iteration may continue until the error metric ψ reaches an acceptably small value, the error metric ψ is not changing significantly, or a selected maximum number of iterations have been performed.

Considering now the error metric ψ in greater detail, the degree to which the calibration algorithm has succeeded is measured by a selected error function $\psi(c,\tilde{c})$, where c=vec (C) and $\tilde{c}$=vec($\tilde{C}$). The vec operator creates a column vector from a matrix by stacking its columns one below another. When the differences between C and $\tilde{C}$ are small, $\psi(c,\tilde{c})$ can be approximated by a second degree Taylor expansion with respect to c about $\tilde{c}$, $$\psi(c,\tilde{c})=\psi(\tilde{c},\tilde{c})-J_\psi(\tilde{c},\tilde{c})(c-\tilde{c})+\tfrac{1}{2}(c-\tilde{c})^T H_\psi(\tilde{c},\tilde{c})(c-\tilde{c}),$$

where $J_\psi(c,\tilde{c})$ is the Jacobian vector of $\psi(c,\tilde{c})$ with respect to c and $H_\psi(c,\tilde{c})$ is the Hessian matrix of $\psi(c,\tilde{c})$ with respect to c. Further, assume that the error function $\psi(c,\tilde{c})$ is selected such that $\psi(\tilde{c},\tilde{c})=0$ and $J_\psi(\tilde{c},\tilde{c})=0$, allowing $\psi(c,\tilde{c})$ to be approximated by a weighted quadratic form:

$$\psi(c,\tilde{c})=\tfrac{1}{2}(c-\tilde{c})^T H_\psi(\tilde{c},\tilde{c})(c-\tilde{c})=(c-\tilde{c})^T W(c-\tilde{c}),$$

where c is a function of the target imager calibration θ 140. Taking the derivative of this expression with respect to the target imager calibration θ 140, setting the result equal to the null vector, and solving provides a multilinear solution for the device calibration. Such multilinear equations are often obtained from closed-form algebraic expressions; however, when such closed-form solutions are not available, general numerical methods may be employed. The error metric ψ is effectively approximated by the second degree, multilinear Taylor expansion with respect to the set of colorimetric target coordinates about a multivector defined by the set of colorimetric reference coordinates. In other words, in the case of an RGB imager, an XYZ color connection space, and N color samples, for the multilinear (non-iterative) solution, the Taylor series of the error metric ψ is calculated relative to the entire set of modeled target XYZ values (i.e., a multivector with N×3 components) about (or near) a constant same-sized multivector of modeled reference XYZ values. The derivatives in this case are taken relative to c.

When the multilinear solution provides a sufficiently small error metric, then iterative optimization of the target imager calibration θ 140 may be omitted. However, in cases when additional refinement is desired, the multilinear solution provides the initial target imager calibration θ140 from which to begin the iterations. During each iteration, the current estimate for the target imager calibration parameters $\hat{\theta}$ is successively refined according to the selected error metric $\psi(c,\tilde{c})$, where c is a function of the device target imager calibration δ 140, i.e., $\chi(\theta)=\psi(f(S,\theta),\tilde{c})$. Sufficiently close to the minimum, this error metric can be approximated by a second-degree Taylor polynomial with respect to θ about $\hat{\theta}$:

$$\chi(\theta)=\chi(\hat{\theta})-J_\chi(\hat{\theta})(\theta-\hat{\theta})+\tfrac{1}{2}(\theta-\hat{\theta})^T H_\chi(\hat{\theta})(\theta-\hat{\theta}),$$

where $J_\chi(\hat{\theta})$ is the Jacobian vector of $\chi(\theta)$ with respect to θ evaluated at $\hat{\theta}$, and $H_\chi(\hat{\theta})$ is the Hessian matrix of $\chi(\theta)$ with respect to θ evaluated at $\hat{\theta}$. Taking the derivative of this expression, setting it equal to the null vector and solving, yields a new estimate for θ (simplified non-linear equation 1):

$$\theta=\hat{\theta}-(H_\chi(\hat{\theta}))^{-1}(J_\chi(\hat{\theta}))^T.$$

Alternatively, one may choose instead to replace the inverse Hessian by a small constant (simplified non-linear equation 2):

$$\theta=\hat{\theta}-\mu(J_\chi(\hat{\theta}))^T.$$

If the current estimate is a good approximation, then equation 1 will converge rapidly on the best solution. On the other hand, if the current estimate is not a good approximation, then equation 1 may fail to improve the estimate. In contrast, as long as the constant value is small enough not to exhaust the downhill direction, equation 2 will generally converge; however, the convergence rate is likely to be quite slow. To vary smoothly between these two extremes, the two equations may be combined heuristically into another simplified non-linear equation, as follows:

$$\theta=\hat{\theta}-(H_\chi(\hat{\theta})+\alpha\,\mathrm{diag}(H_\chi(\hat{\theta})))^{-1}(J_\chi(\hat{\theta}))^T,$$

where diag(A) produces a diagonal matrix containing the diagonal entries of the matrix A. The term α behaves as a blending factor which determines the mix between the two methods: for small α the expression approaches the first method, while for large α the expression approaches the second method. Between iterations, α is adjusted depending on whether the error metric is increasing or decreasing. If the error metric increases during an iteration, then the current estimate $\hat{\theta}$ is kept, and α is increased. If the error metric decreases during an iteration, then the estimate is updated $\hat{\theta}\leftarrow\theta$ and α is decreased. This procedure is Levenberg-Marquardt (LM) minimization. For each iteration, closed-form algebraic expressions are often available for both the Jacobian and the Hessian; however, when such closed-form expressions are not available, general numerical methods may be employed.

In other words, in the case of an RGB imager, an XYZ color connection space, and N color samples, for the non-linear (iterative) solution, a Taylor series of the error metric is considered with respect to a multivector comprising the newly adjusted estimates for the parameters of the target calibration (e.g., a 3×3 transformation matrix) about a multivector comprising the prior parameters estimates. The derivatives in this case are taken relative to θ.

Figure 4:
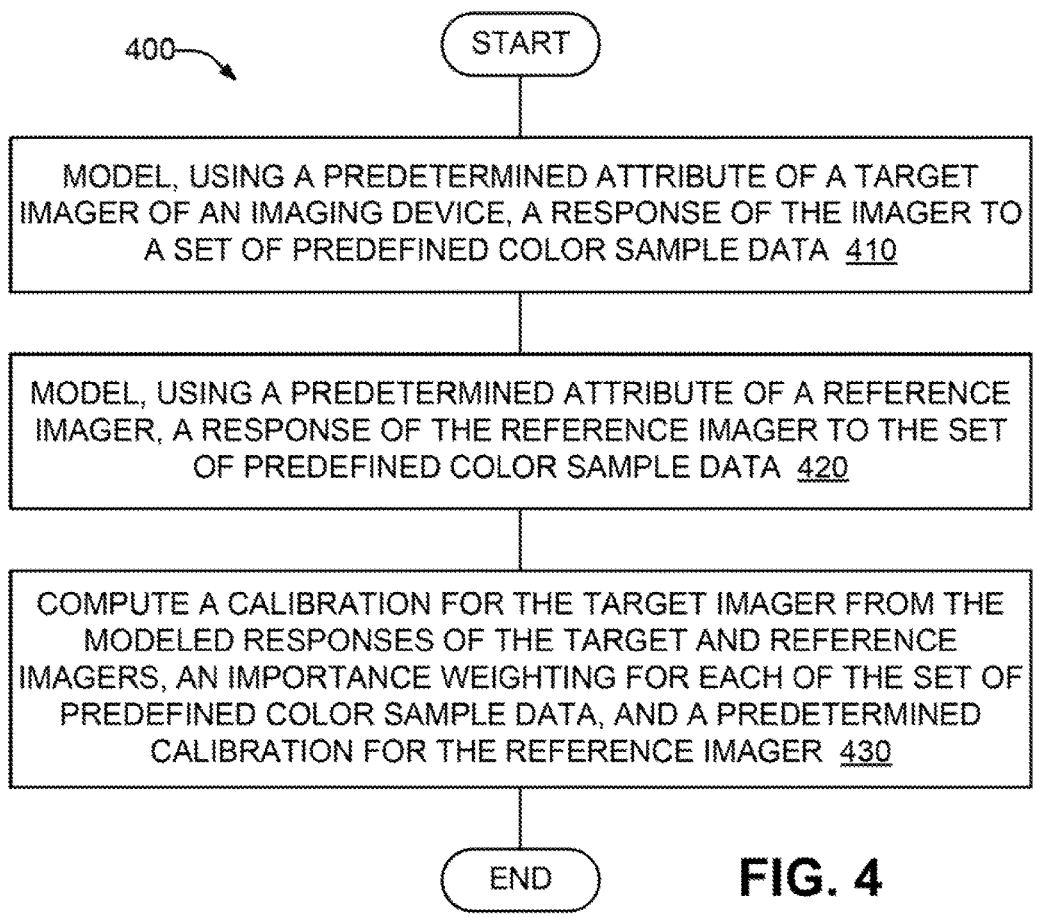
FIG. 4 is a flowchart of a method according to an example of the present disclosure of calibrating an imaging device having a target imager.

Consider now, with reference to FIG. 4, a flowchart of one example method of calibrating an imaging device having a target imager. Alternatively, FIG. 4 may be considered as a flowchart of an example calibrator 150. The method 400 begins, at 410, by modeling, using a predetermined attribute of the target imager, a response of the target imager to a set of predefined color sample data. At 420, the method models, using a predetermined attribute of a reference imager, a response of the reference imager to the set of predefined color sample data. At 430, the method computes a calibration for the target imager from the modeled responses of the target and reference imagers, an importance weighting for each of the set of predefined color sample data, and a predetermined calibration for the reference imager. In some examples, the modeling and the computing may be performed by a processor.

Considering now in greater detail examples of the computing 430, and with reference to FIG. 5, in some examples the computing 430 includes, at 505, constraining the target imager calibration so that a color transformation using the target imager calibration maps the target imager response for a white color sample to the same color space coordinates as a color transformation using the reference imager calibration for the white color sample, and reducing the constrained target imager calibration to an unconstrained target imager calibration without Lagrange multipliers. This facilitates correct color balancing. In this regard, the solution for the matrix M is constrained to enforce white-point preservation. Providing white point preservation with constrained optimization using Lagrange multipliers is complex and computationally intensive, and thus not suitable for implementation in the limited hardware environment (e.g. limited amount of memory, and/or limited processor capability) of many imaging devices. However, the complications of constrained optimization can be avoided, for example, by first normalizing both the RGB and the XYZ data prior to analysis such that at the white point:

$$X_w = Y_w = Z_w = R_w = G_w = B_w = 1.$$

This allows M to be rewritten to include the constraint directly:

$$M = \begin{bmatrix} \rho_x & \rho_y & \rho_z \\ \gamma_x & \gamma_y & \gamma_z \\ \beta_x & \beta_y & \beta_z \end{bmatrix} = \begin{bmatrix} \rho_x & \rho_y & \rho_z \\ \gamma_x & \gamma_y & \gamma_z \\ 1-\rho_x-\gamma_x & 1-\rho_y-\gamma_y & 1-\rho_z-\gamma_z \end{bmatrix}.$$

Then, by defining $$\hat{M} = \begin{bmatrix} \rho_x & \rho_y & \rho_z \\ \gamma_x & \gamma_y & \gamma_z \end{bmatrix}$$

and the matrices $\hat{S}$ and $\hat{C}$ with $$\hat{s}_n = [R_n - B_n \ G_n - B_n]$$

and $$\hat{c}_n = [X_n - B_n \ Y_n - B_n \ Z_n - B_n],$$

solving the constrained equation can be reduced to solving the unconstrained equation $\hat{C} \approx \hat{S}\hat{M}$. In more complicated examples, similarly reducing constrained equations to unconstrained ones without using Lagrange multipliers may be conducted generally using implicit function theory, the chain rule, and Taylor's formula.

In some examples, the computing 430 also includes, at 510, the importance weighting assigning a higher weight to certain selected colors relative to other colors such that color output of the target imager for the selected color samples matches color output of the reference imager for the selected color samples more closely than for at least some other color samples. The selected color samples may be neutral colors. At 525, the computing 430 may include calculating an error indicative of a colorimetric difference between color output data generated by the target imager and color output data generated by the reference imager for a set of sample data. At 530, the computing 430 may include iteratively solving a non-linear equation to compute the target imager calibration until the target imager calibration results in an optimum value of the error. At 535, the computing 430 may include converting the modeled target imager response into colorimetric target coordinates and converting the modeled reference imager response into colorimetric reference coordinates. The colorimetric coordinates may be the modeled color connection space coordinates 310, 320. At 540 the computing 430 may include approximating the error as a second degree, multilinear Taylor series expansion with respect to a multivector comprising the set of colorimetric target coordinates about a multivector comprising the set of colorimetric reference coordinates. At 545 the computing in 430 may include approximating the error as a second degree, multilinear Taylor series expansion with respect to a multivector comprising the current estimate of the target imager calibration about a multivector comprising the prior estimate of the target imager calibration. It may further include selecting a current estimate of the target imager calibration which minimizes the Taylor series approximation of the error, and updating an iteration criterion using the error of the current estimate and the error of the prior estimate. The iteration criterion may be the term α, discussed heretofore.

Figure 6:
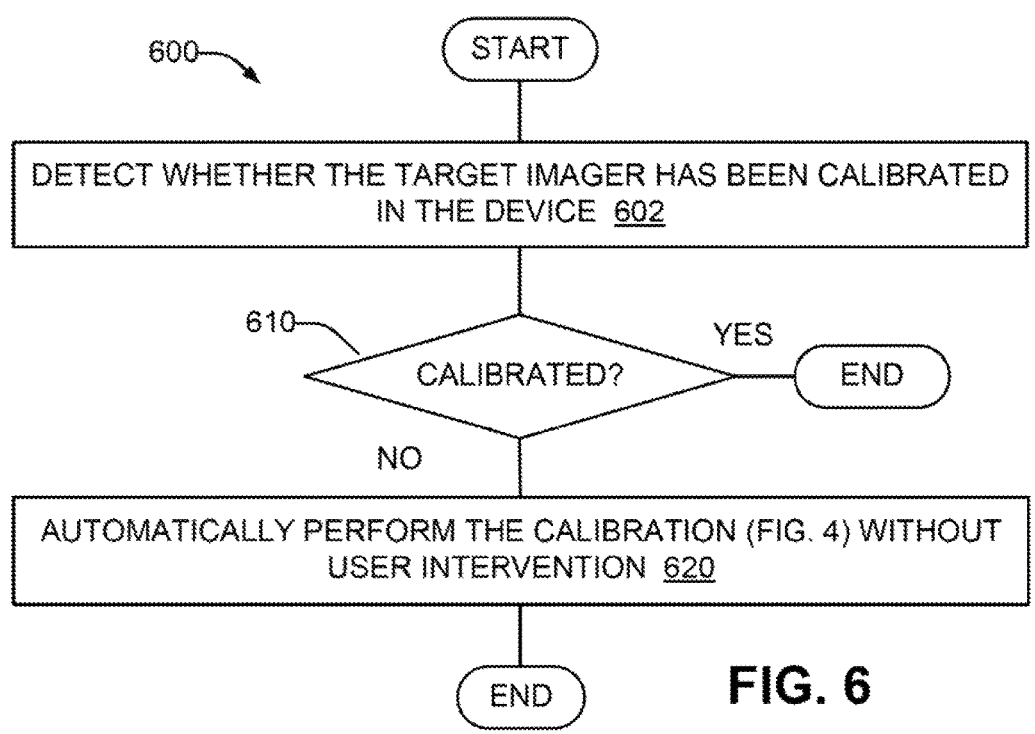
FIG. 6 is a flowchart of a method according to an example of the present disclosure of automatically performing the calibration of FIG. 3 if the target imager has not been calibrated in the device.

Consider now, with reference to FIG. 6, a flowchart of another example method of calibrating an imaging device having a target imager. Alternatively, FIG. 6 may be considered as a flowchart of an example imaging device 100, 200. The method 600 begins, at 610, by detecting whether the calibrating has been performed for the target imager of the imaging device. If the calibrating has been performed ("Yes" branch of 610), then the method 600 ends. If the calibrating has not been performed ("No" branch of 610), then at 620 the calibrating 400 is automatically initiated and performed, without user intervention, in response to the detecting 610. The method 600 may be performed periodically or upon an event, such as a power-up or reset of the imaging device 100, 200. The event can also be an input, such as button press, provided by a user of the imaging device. The target imager may be detected as being uncalibrated upon the first power-up of the imaging device after a particular target imager has been installed in the imaging device. This may occur, for example, the first time a user powers up the imaging device out-of-the-box. This may also occur the first time a user powers up the imaging device after one target imager has been replaced by another, such as during service.

In some examples, one or more blocks or steps discussed herein are automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

While examples of the disclosure, where the target imager is an optical scanner, have calculated a single calibration that is used for scanning all types of media, alternative examples may calculate many calibrations which depend on the media and colorants of the subject being scanned. For example, the optimum color calibration for photographic print samples may be different than the optimum color calibration for printed inkjet samples. In such situations, the target and the reference modelers may each model one or more additional responses of the target and reference imagers respectively to prestored color data of one or more sets of additional plural samples which correspond to those different media or colorant types, and the generator compute one or more corresponding additional calibrations for the target imager from the additional modeled responses of the target and reference imagers, the importance weighting, and the reference calibration. Where multiple color calibrations for the target imager exist, the appropriate calibration in the set of calibrations may be manually or automatically selected based on the type of media and/or the colorant(s) thereon.

Furthermore, examples of the disclosure are not limited to a target imager which is an optical scanner. For example, another imaging device usable with the present disclosure is a digital camera. To determine the imaging attribute of a target and reference camera imager, the spectral responsively of the photosensor array may be measured directly, and characteristics of the light source under which images are captured may be assumed. In one example, the light source is assumed to have the spectral characteristics of a CIE standard light source. However, since the actual light source illuminating the subject, during a given imaging operation, is the ambient radiation plus any flash that is used, alternatively a number of calibrations may be generated for different lighting conditions such as sunlight, clouds, shadow, incandescent, fluorescent, and the like, and automatically or manually selected for the imaging operation.

From the foregoing it will be appreciated that the imaging device and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:

1. A method of calibrating a device having a target imager, comprising:
    modeling with a processor of the device, using a predetermined attribute of the target imager, a response of the target imager to a set of predefined color sample data;
    modeling with the processor, using a predetermined attribute of a reference imager, a response of the reference imager to the set of predefined color sample data; and
    computing with the processor a calibration for the target imager from the modeled responses of the target and reference imagers, an importance weighting for each of the set of predefined color sample data, and a predetermined calibration for the reference imager.

2. The method of claim 1, wherein the attribute of the target imager and the attribute of the reference imager comprise spectral characteristics of the corresponding imager.

3. The method of claim 1, comprising:
    detecting that the calibrating has not been performed for the target imager of the device; and
    responsive to the detecting, automatically performing the calibrating without user intervention.

4. The method of claim 1, wherein a color transformation according to the reference imager calibration maps the reference imager response for a white color sample to particular color space coordinates, and wherein the computing comprises:
    constraining the target imager calibration to produce a color transformation that maps the target imager response for the white color sample to the particular color space coordinates; and
    reducing the constrained target imager calibration to an unconstrained target imager calibration without Lagrange multipliers.

5. The method of claim 1, wherein the importance weighting assigns a higher weight to selected colors relative to other colors such that color output of the target imager for the selected color samples matches color output of the reference imager for the selected color samples more closely than for at least some other color samples.

6. The method of claim 1, wherein the computing comprises:
    calculating an error indicative of a colorimetric difference between color output data generated by the target imager and color output data generated by the reference imager for a set of sample data.

7. The method of claim 6, wherein the computing comprises:
    converting the modeled target imager response for the set of sample data into colorimetric target coordinates;
    converting the modeled reference imager response for the set of sample data into colorimetric reference coordinates; and
    approximating the error as a second degree, multilinear Taylor series expansion with respect to a multivector defined by the set of colorimetric target coordinates about a multivector defined by the set of colorimetric reference coordinates; and
    selecting a target imager calibration which minimizes the error.

8. The method of claim 6, wherein the computing comprises:
    iteratively solving a non-linear equation to compute the target imager calibration until the target imager calibration results in an optimum value of the error.

9. The method of claim 8, wherein the iteratively solving comprises:
    approximating the error as a second degree, multilinear Taylor series expansion with respect to a multivector defined by a current estimate of the target imager calibration about a multivector defined by a prior estimate of the target imager calibration; and
    selecting a current estimate of the target imager calibration which minimizes the Taylor series approximation of the error; and
    updating an iteration criterion using the error of the current estimate and the error of the prior estimate.

10. An imaging device, comprising:
    a target imager having a target imaging attribute;
    a controller, coupled to the target imager, having a memory that prestores color data of plural samples, an importance weighting for each of the samples, a reference imaging attribute of a reference imager, and a reference calibration for the reference imager, a target modeler that models a response of the target imager to the color data using the target imaging attribute, a reference modeler that models a response of the reference imager to the color data using the reference imaging attribute, and a generator that computes a calibration for the target imager from the modeled responses of the target and reference imagers, the importance weighting, and the reference calibration.

11. The imaging device of claim 10, wherein the target imager calibration generator comprises a target calibration optimizer that generates a target calibration according to a multilinear equation, and if an error in color output between the target imager using the target calibration and the reference imager using the reference calibration exceeds a threshold, iteratively refines the target calibration according to a non-linear equation.

12. The imaging device of claim 11, wherein the optimizer generates the target calibration from the modeled target imager response, modeled reference color connection space coordinates derived from the modeled reference imager response, and the reference calibration.

13. The imaging device of claim 10, wherein the target image calibration generator comprises:

an error metric calculator that calculates a colorimetric difference in color output between the target imager calibrated by the target calibration and the reference imager calibrated by the reference calibration.

14. The imaging device of claim 10, wherein the error metric calculator calculates a colorimetric difference between (a) modeled reference color connection space coordinates derived from the modeled reference imager response and the reference calibration, and (b) modeled target color connection space coordinates derived from the modeled target imager response and the target calibration.

15. The imaging device of claim 10, wherein the plural samples correspond to a first colorant and a first media type, wherein the target and the reference modelers each model an additional response of the target and reference imagers respectively to prestored color data of additional plural samples which correspond to at least one of a second colorant or a second media type, and wherein the generator computes an additional calibration for the target imager from the additional modeled responses of the target and reference imagers, the importance weighting, and the reference calibration.

16. A method of calibrating a target imager, comprising:

modeling, using an imaging attribute of the target imager and the reference imager, a device-dependent color output response of each imager to data representing predetermined color samples;

calculating an error that represents a colorimetric difference in the output response between the target imager and the reference imager based on the modeled color output responses, a predetermined importance weighting for each of the samples, and a predetermined calibration for the reference imager; and establishing a calibration for the target imager that reduces the error to an optimum value.

* * * * *